UNITED STATES PATENT OFFICE.

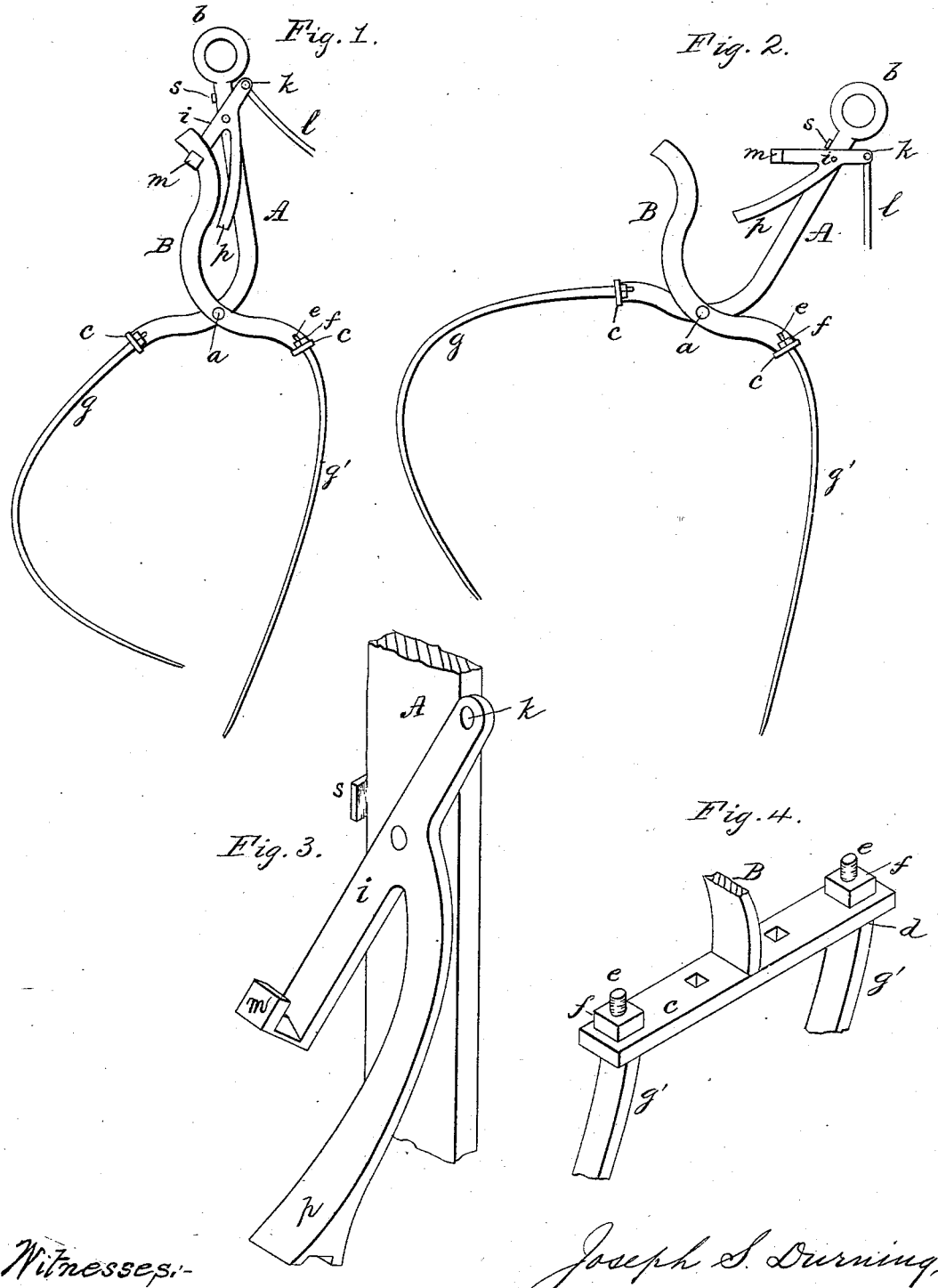

JOSEPH S. DURNING, OF ALLEGHENY, PENNSYLVANIA.

HORSE HAY-FORK.

SPECIFICATION forming part of Letters Patent No. 278,897, dated June 5, 1883.

Application filed November 4, 1882. (No model.)

*To all whom it may concern:*

Be it known that I, JOSEPH S. DURNING, of Allegheny, in the county of Allegheny and State of Pennsylvania, have invented certain new and useful Improvements in Horse Hay-Forks; and I do hereby declare that the following is a full, clear, and exact description of the invention, which will enable others skilled in the art to which it appertains to make and use the same, reference being had to the accompanying drawings, which form a part of this specification, in which—

Figure 1 represents in side elevation my improved fork in closed position. Fig. 2 shows it open. Fig. 3 is a perspective detail of the arm and lever. Fig. 4 is a like view of cross-bar and tines.

This invention relates to the construction of horse hay-forks; and it consists in the construction, arrangement, and combination of parts, substantially as hereinafter fully described and claimed.

The general form of the fork is that of a scissors, consisting of the two crossed lever-arms A B, pivoted at $a$. Arm A is nearly straight above the pivot-point, and is formed or provided with an eye or ring, $b$, as shown, whereby to attach the fork to the lifting rope or chain. Each of the arms at its lower end is welded or bolted to a cross-bar, $c$, which carries the fork-tines. The tines are each formed with a shoulder, $d$, and screw $e$, which passes through the cross-bar, and is secured by a nut, $f$, as shown. The tines $g$ on the arm A are very much curved, while the tines $g'$ on arm B are almost or quite straight. The purpose of this is: In entering the material to be lifted I design the device to be used somewhat as a spade, the handles being grasped in the position shown by Fig. 2, with the tines $g'$ pointing nearly straight downwardly. Then the operator places his foot on the cross-bar of tines $g'$, and forces them down completely into the hay or other material. Upon now forcing the arm A toward the arm B, the curved tines $g$ are swept into the material and toward the tines $g'$, gathering the material into a bundle, the lower ends of tines $g$ inclosing the bundle underneath partly or wholly. In this position it is necessary to lock the arms together. I effect this by means of the following device:
On the arm A, I pivot the lever $i$, having at one end an eye, $k$, for the attachment of the stripping-rope $l$, and at the other end a lug, $m$, to pass over the arm B, and retain it in the locked position shown by Fig. 1. From lever $i$ extends the discharger $p$, whose lower end is forked to embrace the edge of arm B. When the tines $g'$ are driven into the material, and arm A closed toward arm B until the lug $m$ falls down outside the arm B and locks it, the load is ready to hoist. When it has reached the proper point, a slight pull on rope $l$ forces the lever $i$ and its lug $m$ out of the way of arm B, upon which the arms A B can separate and drop the load; but to facilitate the separation of the arms A B a further pull of the rope $l$ forces the discharger $p$ against the arm B and compels the separation of the arms.

If desired, the end of the discharger $p$ may be provided with a roller to lessen friction.

To prevent the discharger $p$ from passing off the arm B in its movement, the arm A has a stop-lug, $s$, suitably located, substantially as shown.

Forks are usually made for special uses, a fork specially adapted for long hay not being good for short hay, or one adapted for manure not being good for rye-straw, on account of the position of the tines. I construct my fork with eight or more tines, (four on each arm,) and detachable therefrom.

For long hay or straw I remove the two inner tines from one of the arms, while for short hay or straw, or for manure, I use all the tines. Thus a single fork may be in a few moments adapted especially for the use desired.

I claim as my invention—

1. In a horse hay-fork comprising two tined arms crossing each other and pivoted together at their junction, the combination therewith of a tripping-lever pivoted to one of said arms and adapted to bear directly against the other arm, and suitable means of operating said lever, substantially as described, whereby when said lever is operated the arms are forced apart in a positive manner for dropping the load.

2. In a horse hay-fork, the combination of the pivoted tine-bearing arms A B, the lever $i$, pivoted on one of said arms, and having the discharging extension $p$, adapted to bear against the other arm, and a suitable stop or lug adapted and located to limit the discharging movement of said extension, substantially as specified.

3. In a horse hay-fork, the combination of two crossed tine-bearing arms, A B, pivoted together at their junction, lever $i$, pivoted on one of said arms, and having the locking-lug $m$ and the discharge extension $p$, the stop-lug $s$, and an operating-cord attached to said lever $i$, substantially as described.

In testimony that I claim the foregoing as my own I have hereto affixed my signature in presence of two witnesses.

JOSEPH S. DURNING.

Witnesses:
JOS. B. CONNOLLY,
D. E. DAVIS.